(12) United States Patent
Callis et al.

(10) Patent No.: US 6,720,853 B1
(45) Date of Patent: Apr. 13, 2004

(54) ELECTRICALLY OPERATED SOLENOID HAVING AN ADJUSTABLE ACTUATOR PIN LENGTH

(75) Inventors: Brad Callis, Greentown, IN (US); Warn Wasson, Bristol, IN (US)

(73) Assignee: Wabash Magnetics, LLC, Wabash, IN (US)

(*) Notice: Subject to any disclaimer, the term of this patent is extended or adjusted under 35 U.S.C. 154(b) by 0 days.

(21) Appl. No.: 10/619,872

(22) Filed: Jul. 15, 2003

(51) Int. Cl.$^7$ .............................. H01F 7/08; H01F 3/00
(52) U.S. Cl. ..................... 335/258; 335/255; 335/273; 335/279
(58) Field of Search ................... 335/255–264, 335/273, 278, 279; 251/129.18

(56) References Cited

U.S. PATENT DOCUMENTS

| | | |
|---|---|---|
| 4,218,669 A | 8/1980 | Hitchcock et al. |
| 4,463,332 A | 7/1984 | Everett |
| 4,905,960 A | 3/1990 | Barnhart et al. |
| 4,988,074 A | 1/1991 | Najmolhoda |
| 5,006,901 A * | 4/1991 | Dick .......................... 335/258 |
| 5,074,326 A | 12/1991 | Baker et al. |
| 5,092,365 A | 3/1992 | Neff |
| 5,136,774 A | 8/1992 | Neff |
| 5,204,652 A | 4/1993 | Baker et al. |
| 5,218,999 A | 6/1993 | Tanimoto |
| 5,289,841 A | 3/1994 | Maranzano |
| 5,467,963 A | 11/1995 | Crofts et al. |
| 5,810,030 A | 9/1998 | Uchiyama et al. |
| 5,842,679 A | 12/1998 | Kolchinsky |
| 6,068,237 A | 5/2000 | Holmes et al. |
| 6,086,042 A | 7/2000 | Scott et al. |
| 6,404,314 B1 | 6/2002 | Arnold et al. |

* cited by examiner

*Primary Examiner*—Ramon M. Barrera
(74) *Attorney, Agent, or Firm*—Woodard, Emhardt, Moriarty, McNett & Henry LLP

(57) ABSTRACT

An electrically operated solenoid for controlling a valve mechanism, including a coil assembly, a magnetic armature defining a passage extending therethrough, a pole piece defining a passage extending therethrough generally aligned with the passage in the armature, and an actuator pin having a first portion disposed within the passage in the armature and a second portion extending through the passage in the pole piece for engagement with the valve mechanism. The actuator pin is engaged with the armature such that reciprocating movement of the armature correspondingly displaces the actuator pin to control operation of the valve mechanism. An adjustment screw is threadingly engaged within a threaded portion of the armature passage such that displacement of the adjustment screw correspondingly adjusts a position of the actuator pin relative to the armature along an actuation axis.

35 Claims, 3 Drawing Sheets

ELECTRICALLY OPERATED SOLENOID HAVING AN ADJUSTABLE ACTUATOR PIN LENGTH

FIELD OF THE INVENTION

The present invention relates generally to the field of electrically operated solenoid devices, and more particularly relates to an electrically operated solenoid having an adjustable actuator pin length.

BACKGROUND OF THE INVENTION

Electrically operated solenoid devices are used in a wide variety of automotive and industrial applications to control the flow of a gas or fluid. An electrically operated solenoid device is generally comprised of an electrical coil which, when energized, produces an electromagnetic field that is utilized to perform some function. In the case of a solenoid valve actuator, the electromagnetic field is utilized to displace an actuator member along an actuation axis. The actuator member is in turn operatively engaged with a valve mechanism such that axial displacement of the actuator member correspondingly engages/disengages a portion of the valve mechanism to control the flow of a gas or fluid therethrough.

In some instances, the overall effective length of the actuator member must be tightly regulated or controlled to ensure proper engagement/disengagement with the valve mechanism. This is particularly evident with regard to solenoid devices having relatively short stroke lengths. Controlling the effective length of the actuator member may be useful to maximize the operating efficiency of the solenoid device and to enhance the performance characteristics of the valve mechanism. Additionally, controlling the effective length of the actuator member may improve solenoid valve response times by minimizing solenoid stroke tolerance build-up to decrease the time required to open and/or close the valve mechanism. Moreover, controlling the effective length of the actuator member may be useful to correspondingly adjust the open position and/or closed position of the valve mechanism.

Thus, there is a general need in the industry to provide an improved electrically operated solenoid having means for adjusting or otherwise controlling the overall effective length of the actuator member. The present invention meets this need and provides other benefits and advantages in a novel and unobvious manner.

SUMMARY OF THE INVENTION

The present invention relates generally to an electrically operated solenoid device. While the actual nature of the invention covered herein can only be determined with reference to the claims appended hereto, certain forms of the invention that are characteristic of the preferred embodiments disclosed herein are described briefly as follows.

In one form of the present invention, an electrically operated solenoid is provided for controlling a mechanical device, comprising a coil assembly extending along an actuation axis, an armature member adapted for reciprocating movement along the actuation axis and defining a first passage extending therethrough, a pole piece member defining a second passage extending therethrough generally aligned with the first passage in the armature member, an shaft member having a first portion disposed within the first passage in the armature member and a second portion extending through the second passage in the pole piece member for engagement with the mechanical device, and an adjustment member extending into the first passage in the armature member and into engagement with the shaft member, wherein the adjustment member is displaceable along the first passage of the armature member to correspondingly adjust a position of the shaft member relative to the armature member along the actuation axis.

In another form of the present invention, an electrically operated solenoid is provided for controlling a mechanical device, comprising a bobbin extending along an actuation axis, an energizing coil wire wound about the bobbin, a plunger adapted for reciprocating movement along the actuation axis and defining a first passage extending therethrough which includes a threaded portion, a core defining a second passage extending therethrough generally aligned with the first passage in the plunger, an actuator pin having a first portion disposed within the first passage in the plunger and a second portion extending through the second passage in the core for engagement with the mechanical device, and an adjustment screw threadingly engaged within the threaded portion of the first passage in the plunger and into engagement with the actuator pin, wherein the adjustment screw is threadable along the threaded portion of the first passage to correspondingly adjust a position of the actuator pin relative to the plunger along the actuation axis.

In yet another form of the present invention, an electrically operated solenoid is provided for controlling a mechanical device, comprising a housing extending along an actuation axis between a first end and an opposite second end, a bobbin defining an interior region extending along the actuation axis, an energizing coil wire wound about the bobbin, a plunger adapted for reciprocating movement along the actuation axis and defining a first passage extending therethrough and including a threaded portion disposed adjacent the first end of the housing, an actuator pin having a first end portion disposed within the first passage in the plunger and a second end portion extending along the interior region of the bobbin for engagement with the mechanical device adjacent the second end of the housing, and an adjustment screw threadingly engaged within the threaded portion of the first passage in the plunger adjacent the first end of the housing and into engagement with the actuator pin, wherein the adjustment screw is threadable along the threaded portion of the first passage to correspondingly adjust a position of the actuator pin relative to the plunger along the actuation axis.

It is one object of the present invention to provide an improved electrically operated solenoid having an adjustable actuator pin length.

Further objects, features, advantages, benefits, and further aspects the present invention will become apparent from the drawings and description contained herein.

DESCRIPTION OF THE ILLUSTRATED EMBODIMENTS

Figure 1:
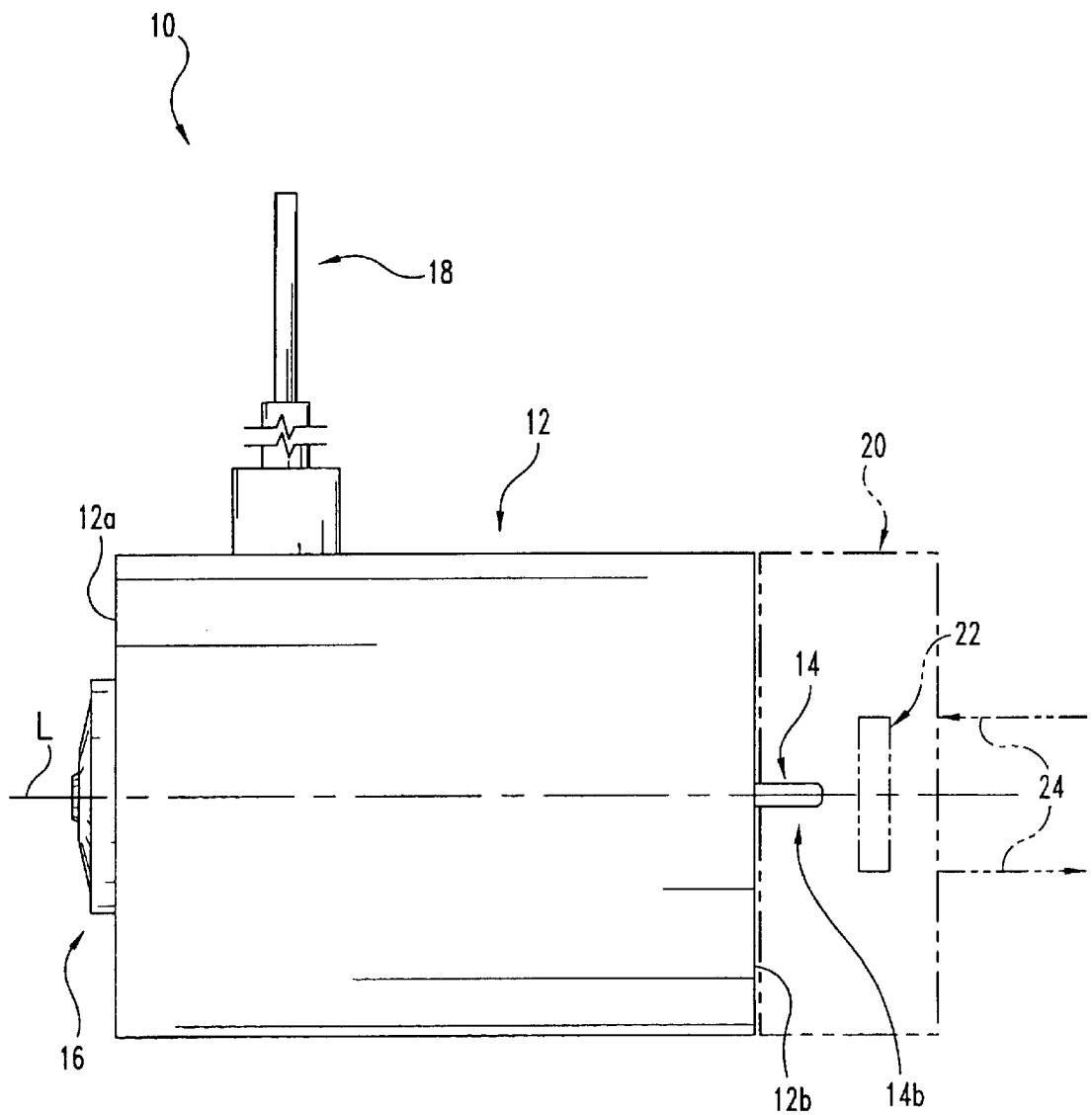
FIG. 1 is side view of an electrically operated solenoid device according to one form of the present invention.

For the purposes of promoting an understanding of the principles of the invention, reference will now be made to the embodiments illustrated in the drawings and specific language will be used to describe the same. It will nevertheless be understood that no limitation of the scope of the invention is hereby intended, such alterations and further modifications in the illustrated devices, and such further applications of the principles of the invention as illustrated herein being contemplated as would normally occur to one skilled in the art to which the invention relates.

Referring to FIG. 1, shown therein is an electrically operated solenoid 10 according to one form of the present invention. The solenoid device 10 is generally comprised of a solenoid body 12 having a proximal end 12a and a distal end 12b, with an end portion of an actuator member 14 extending from the distal end 12b and positioned along an actuation axis L. In the illustrated embodiment of the invention, a cap or cover member 16 is removably positioned over an access opening formed through the proximal end 12a of the solenoid body 12 which provides access to certain inner components of the solenoid device 10 to adjust the effective length of the actuator member 14, the details of which will be discussed below. One or more electrical conductors or leads 18 extend from the solenoid body 12 and are electrically connected to an electronic controller or power source (not shown) adapted to electronically control operation of the solenoid device 10 from a remote location, the details of which would be apparent to one of skill in the art and therefore need not be discussed herein.

In one embodiment of the invention, displacement of the actuator member 14 along the actuation axis L functions to control operation of a mechanical device, such as, for example, a control valve mechanism 20 disposed adjacent the distal end 12b of the solenoid body 12. In the illustrated embodiment of the invention, the control valve mechanism 20 is schematically depicted as a discrete component operatively attached or mounted to the distal end 12b of the solenoid body 12. The control valve mechanism 20 may be attached or mounted to the solenoid body 12 by a variety of methods, including, for example, via a number of fasteners, by a threaded coupling arrangement, or by other means for attachment know to those of skill in the art. However, it should be understood that in other embodiments of the invention, the control valve mechanism 20 may be configured as an integral part of the solenoid body 12 to form a unitary solenoid valve assembly. The end portion 14b of the actuator member 14 cooperates with a valve member 22, such as, for example, a valve seal element or a valve seat, to control the flow of a gas or fluid 24 through the control valve mechanism 20. As will be discussed in greater detail below, adjustment of the effective length of the actuator member 14 correspondingly adjusts the open and/or closed positions of the control valve mechanism 20. In a preferred embodiment of the invention, such adjustment is performed with the control valve mechanism 20 remaining attached to the solenoid device 10.

In a specific embodiment of the invention, the control valve mechanism 20 is a 3-way or 4-way pneumatic valve adapted to control the flow of a gas, such as example, air. However, it should be understood that the solenoid device 10 may be used in association with other types and configurations of valve mechanisms to control the flow of a gas or fluid, and that the control valve mechanism 20 illustrated in schematic form in FIG. 1 is exemplary only. For example, another embodiment of a control valve mechanism suitable for use in association with the present invention is illustrated and described in U.S. Pat. No. 6,086,042 to Scott et al., the contents of which are hereby incorporated by reference in their entirety. It should also be understood that the solenoid device 10 may be used in a variety of applications to control the operation of a number of different types and configurations of mechanical devices and mechanisms, and that the scope of the present invention is not in any way limited to controlling the operation of a valve mechanism.

Figure 2:
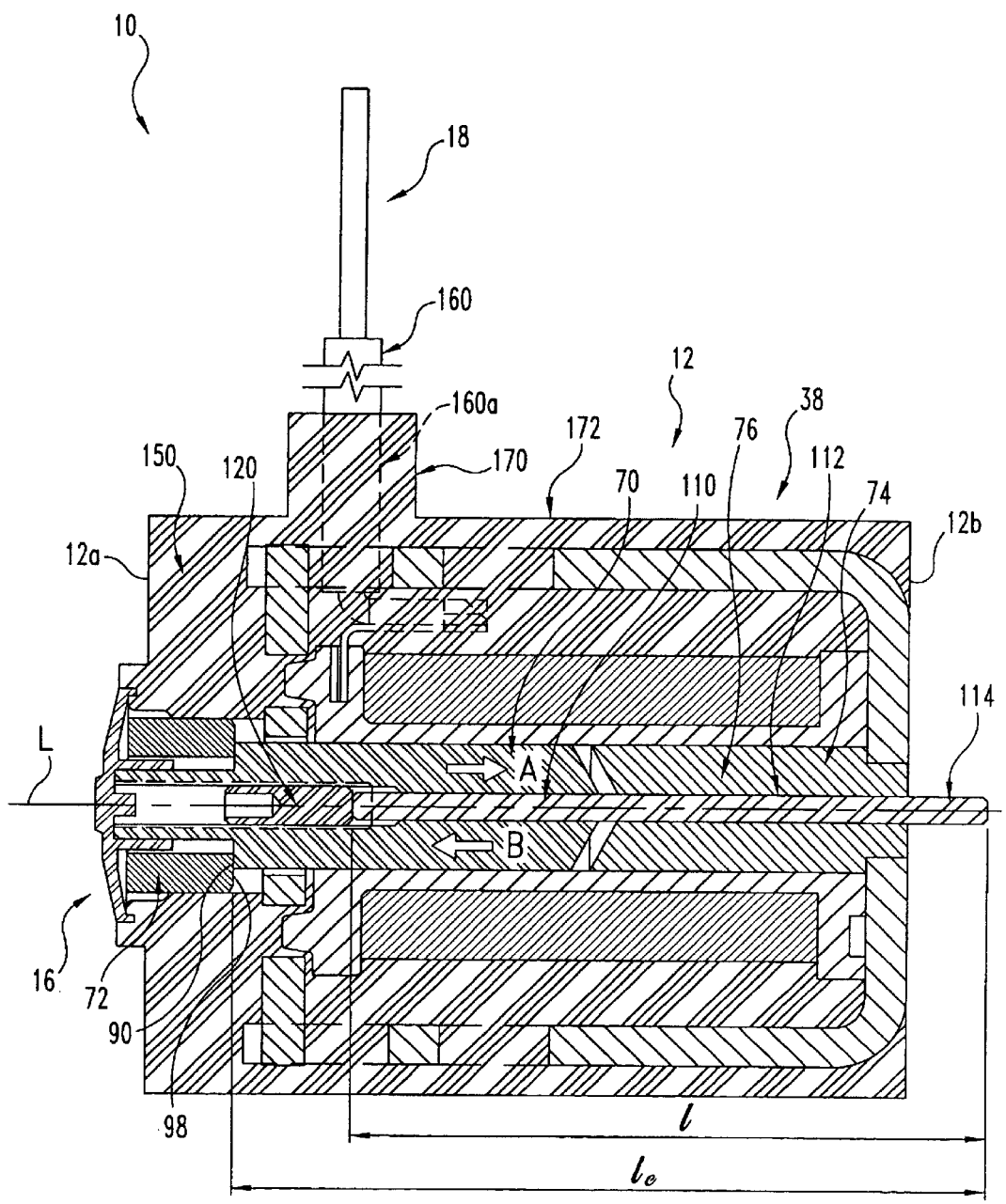
FIG. 2 is partial cross-sectional side view of the electrically operated solenoid device illustrated in FIG. 1.
Figure 3:
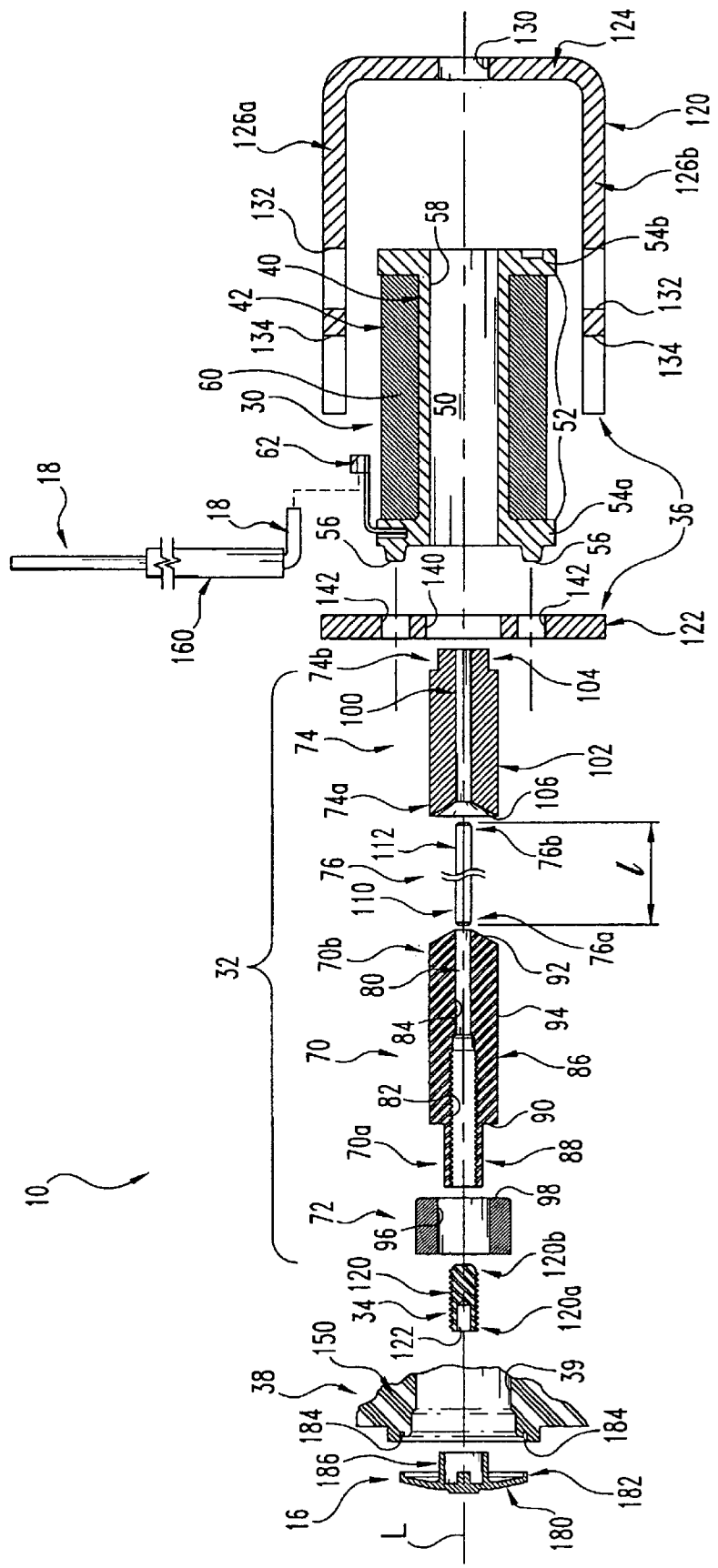
FIG. 3 is an exploded partial cross-sectional side view of the electrically operated solenoid device illustrated in FIG. 2.

Referring to FIGS. 2 and 3, shown therein are further details regarding the electrically operated solenoid device 10. In one embodiment of the invention, the solenoid device 10 is generally comprised of a coil assembly 30, an actuator assembly 32, an adjustment member 34, a yoke member 36, and an outer housing 38. The structural features and functions associated with each of these components will be discussed in detail below.

In one embodiment of the invention, the coil assembly 30 is generally comprised of a bobbin 40 and an energizing coil 42. The bobbin 40 is preferably formed of a non-magnetic material, such as, for example, a plastic material or other non-magnetic materials that would occur to one of skill in the art. The bobbin 40 has a central portion defining an interior region or passageway 50 extending axially therethrough. The bobbin 40 also defines an exterior region 52 defined between a pair of outwardly extending ribs or flanges 54a, 54b disposed at opposite ends of the bobbin 40. A number of protrusions or projections 56 extend axially from the rib 54a, the purpose of which will be discussed below. The interior passageway 50 of the bobbin 40 extends generally along the actuation axis L and is bound by an inner surface 58. In one embodiment of the invention, the central portion of the bobbin 40 defining the interior passageway 50 has a cylindrical configuration so as to define a cylindrically-shaped inner surface 58 having a substantially uniform diameter extending along the entire length of the bobbin 40.

The energizing coil 42 is comprised of an electrically conductive wire 60 wound about the exterior region 52 of the bobbin 40 between the ribs 54a, 54b. One or more electrical terminals or lead supports 62 configured to receive respective ones of the electrical lead wires 18 are operatively mounted to the bobbin rib 54a. The lead supports 62 are electrically connected to the coil wire 60 to thereby electrically connect the lead wires 18 to the coil wire 60. Although a particular embodiment of a coil assembly 30 has been illustrated and described herein, it should be understood that other types and configurations of coil assemblies are also contemplated as falling within the scope of the present invention.

The actuator assembly 32 is generally comprised of an armature member or actuator plunger 70, a stop member or plug 72, a pole piece member or core 74, and a control shaft member or actuator pin 76. The plunger 70 is formed of a magnetic material and is adapted for reciprocating movement along the actuation axis L in the direction of arrows A and B (FIG. 2). The core 74 is also formed of magnetic material and is at least partially disposed within the interior passageway 50 of the bobbin 40 to magnetically attract the plunger 70 upon energizing the coil 42. More specifically, energizing the coil 42 generates an electromagnetic force that is conveyed through the core 74, which in turn exerts a magnetic attraction force onto the plunger 70 to axially displace the plunger 70 toward the core 74 in the direction of arrow A. The actuator pin 76 is operatively engaged with the plunger 70 to form a two-piece actuator member 14. As should be appreciated, displacement of the plunger 70 in the direction of arrow A correspondingly displaces the actuator pin 76 along the actuation axis L to control operation of the valve mechanism 20 (FIG. 1). As would be apparent to one of skill in the art, the valve mechanism 20 may include a biasing device, such as, for example, a return spring, configured to exert a biasing force onto the actuator pin 76 to urge the actuator pin 76 and the plunger 70 in the direction of arrow B upon de-energizing the coil 42. The stop member or plug 72 functions to limit or restrict displacement of the plunger 70 upon its return to the original position shown in FIG. 2. Further details regarding the individual components and operation of the actuator assembly 32 will be discussed below.

The plunger 70 is formed of a magnetic material, such as, for example, a low carbon steel material, a stainless steel material, or any other magnetic material that would occur to one of skill in the art. In a preferred embodiment of the invention, the plunger 70 has a tubular configuration defining an axial passage 80 extending entirely therethrough between a proximal end 70a and a distal end 70b, the purpose of which will be discussed below. In one embodiment of the invention, the passage 80 includes a threaded portion 82 and a non-threaded portion 84. The threaded portion 82 extends from the proximal end 70a of the plunger 70 and is preferably positioned adjacent the proximal end 12a of the solenoid body 12 (FIG. 2). The non-threaded portion 84 extends from the threaded portion 82 to the distal end 70b of the plunger 70.

In the illustrated embodiment of the invention, the plunger 70 includes a main body portion 86 and a stem portion 88 extending therefrom, with the plunger stem 88 having a reduced outer profile relative to the plunger body 86 so as to define a shoulder 90 therebetween. The distal end portion of the plunger body 86 defines a tapered end portion 92. The plunger body 86 preferably has an external surface 94 that closely corresponds with the internal surface 58 of the bobbin passageway 50. In this manner, the plunger 70 may be operatively guided along the actuation axis L via sliding engagement between the external plunger surface 94 and the internal bobbin surface 58. In a specific embodiment, the plunger body 86 and the plunger stem 88 each have a substantially cylindrical shape so as to define an annular shoulder 90, a conicaly shaped end portion 92, and a substantially cylindrical external plunger surface 94. It should be understood, however, that other shapes and configurations of the plunger body 86 and the plunger stem 88 are also contemplated, including, for example, a rectangular configuration, a hexagonal configuration, or any other configuration that would occur to one of skill in the art.

The plug 72 is positioned adjacent the proximal end 12a of the solenoid body 12 and serves to limit or restrict movement of the plunger 70 in the direction of arrow B. In one embodiment of the invention, the plug 72 has a ring-like configuration defining a central opening 96 extending therethrough. The central opening 96 is generally aligned along the actuation axis L so as to receive the stem portion 86 of the plunger 70 therein. In one embodiment of the invention, the plug 72 has a cylindrical configuration; however, other shapes and configurations are also contemplated as would occur to one of skill in the art. As discussed above, the plug 72 limits displacement of the plunger 70. More specifically, upon de-energizing the coil 42, a biasing force urges the plunger 70 away from the core 74 in the direction of arrow B. Displacement of the plunger 70 in the direction of arrow B is limited via abutment of the plunger shoulder 90 against the axially facing bearing surface 98 of the plug 72. As should be appreciated, the range of reciprocating movement of the plunger 70 along the actuation axis L (i.e., the stroke length of the solenoid device 10) is limited by the overall length of the plunger 70 in relation to the distance separating the stop member 72 and the core member 74.

In a preferred embodiment of the invention, the plug 72 is formed as an individual component separate from the solenoid housing 38. However, it should be understood that the plug 72 may alternatively be formed as an integral portion of the solenoid housing 38. In one embodiment of the invention, the plug 72 is removably engaged within an opening or recess 39 formed in the solenoid housing 38 adjacent the proximal end 12a of the solenoid body 12. The plug 72 may be removably engaged with the solenoid housing 38 or other portions of the solenoid device 10 via a press fit connection, a threaded connection, by one or more fasteners, or by other means for connection that would occur to one of skill in the art. As should be appreciated, removal of the plug 72 from the solenoid housing 38 provides unobstructed access to the plunger 70 so as to allow the plunger 70 to be entirely removed from the solenoid body 12. As should also be appreciated, removal of the plunger 70 provides an opportunity for insertion of a plunger having a different length to correspondingly provide the solenoid device 10 with a variable stroke length.

The core 74 is formed of a magnetic material, such as, for example, a low carbon steel material, a stainless steel material, or any other magnetic material that would occur to one of skill in the art. In a preferred embodiment of the invention, the core 74 has a tubular configuration defining a passage 100 extending entirely therethrough between a proximal end 74a and a distal end 74b, the purpose of which will be discussed below. In one embodiment of the invention, the core 74 includes a main body portion 102 and a stem portion 104 extending therefrom. The main body portion 102 is at least partially disposed within the interior passageway 50 of the bobbin 40, distally of the plunger 70, with the core passage 100 generally aligned with the plunger passage 80 along the actuation axis L.

The core 74 is preferably stationarily positioned within the internal bobbin passageway 50. In one embodiment, the distal stem portion 104 of the core 74 is engaged within a corresponding opening 130 extending through a base plate 124 of the yoke member 36, with the bobbin rib 54b being secured to the yoke base plate 124. It should be understood, however, that other methods of securing the core 74 in a stationary position relative to the bobbin 40 are also contemplated. For example, an inward compression force produced by tightly winding the coil wire 60 about the exterior region 52 of the bobbin 40 may be used to inwardly deforming the central portion of the bobbin 40 to thereby engage the inner bobbin surface 58 into engagement with the outer surface of the core 74, the details of which are disclosed in U.S. Pat. No. 6,086,042 to Scott et al., the contents of which have been incorporated herein by reference.

In one embodiment of the invention, the core 74 has a substantially cylindrical shape, preferably defining an outer profile substantially corresponding to the outer profile of the main body portion 86 of the plunger 70. However, other shapes and configurations of the core 74 are also contemplated, such as, for example, a rectangular configuration, a hexagonal configuration, or any other configuration that would occur to one of skill in the art. In the illustrated embodiment of the invention, the proximal end 74a of the core 74 defines an inwardly tapered recess 106 configured to engagingly receive the tapered distal end portion 92 of the plunger 70 therein. However, it should be understood that in other embodiments of the invention, the distal end 70b of the plunger 70 may alternatively define an inwardly tapered recess configured to engagingly receive a tapered proximal end portion of the core 74 therein, or that the plunger 70 and the core 74 may define non-tapered, substantially flat opposing end surfaces.

As discussed above, the solenoid device 10 includes an actuator member 14 cooperating with a valve member to control the flow of a gas or fluid through a valve mechanism, such as, for example, the valve mechanism 20 illustrated in FIG. 1. In a preferred embodiment of the invention, the actuator member 14 is a two-piece structure comprising the plunger 70 and the actuator pin 76 operatively engaged within the plunger passage 80. As a result, displacement of the plunger 70 correspondingly displaces the actuator pin 76 along the actuation axis L to control operation of the valve mechanism 20. As will be discussed in greater detail below, since the actuator pin 76 and the plunger 70 are formed as separate or discrete components, the position of the actuator pin 76 relative to the plunger 70 may be adjusted to provide the two-piece actuator member 14 with a variable overall length. Additionally, actuator pins 76 having different lengths may be used interchangeably with the solenoid device 10 to control different types and configurations of valve mechanism without having to change the design and/or configuration of other solenoid components. This interchangeability feature tends to reduce the design and manufacturing costs associated with the solenoid device 10.

The actuator pin 76 is preferably formed of a nonmagnetic material, such as, for example, a plastic material, a composite material, or any other non-magnetic material that would occur to one of skill in the art. However, the actuator pin 76 may alternatively be formed of a magnetic material. The actuator pin 76 has a length l extending from a proximal end 76a to a distal end 76b. As illustrated in FIG. 2, a proximal portion 110 of the actuator pin 76 is disposed within the passage 80 in the plunger 70 while a distal portion 112 of the actuator pin 76 extends entirely through the passage 100 in the core 74. The distal-most end portion 114 of the actuator pin 76 extends from the distal end 12b of the solenoid body 12 for engagement with the valve member 22 to control the flow of the gas or fluid through the valve mechanism 20 (FIG. 1).

As illustrated in FIG. 2, the proximal portion 110 of the actuator pin 76 is engaged within the plunger passage 80 so as to define an overall effective length $l_e$ of the two-piece actuator member 14, as measured between the plunger shoulder 90 and the distal end 76b of the actuator pin 76. As will be discussed below, the adjustment member 34 is adapted to adjust the effective length $l_e$ of the two-piece actuator member 14, which correspondingly changes the position of the distal end 76a of the actuator pin 76 relative to the valve member 22 of the valve mechanism 20. In one embodiment of the invention, the outer cross section of the proximal portion 110 of the actuator pin 76 is sized and shaped to closely correspond with the inner cross section of the non-threaded portion 84 of the plunger passage 80. In this manner, the entire length of the proximal portion 110 positioned within the plunger passage 80 is firmly supported to substantially prevent deflection or bending, thereby increasing the column strength of the actuator pin 76, particularly during compressive loading of the actuator pin 76.

In a preferred embodiment of the invention, the outer cross section of the distal portion 112 of the actuator pin 76 is sized and shaped to closely correspond with the inner cross section of the passage 100 extending through the core 74. In this manner, the entire length of the distal portion 112 positioned within the core passage 100 is firmly supported to substantially prevent deflection or bending, thereby increasing the column strength of the actuator pin 76, particularly during compressive loading of the actuator pin 76. It should be appreciated that absent the support provided by the core 74, the distal portion 112 of the actuator pin 76 would otherwise extend in an unsupported, cantilever-type manner from the plunger 70. As should also be appreciated, preventing deflection or bending of the actuator pin 76 minimizes the likelihood of pin breakage due to the development of excessive shear forces and/or fatigue failure resulting from repeated cycling of the solenoid device 10. It should further be appreciated that the core 74 also serves to guide the actuator pin 76 along the actuation axis L as the distal portion 112 is slidably displaced along the core passage 100 during reciprocating movement of the plunger 70. Due to the unique design of the actuator assembly 30, additional support structures and/or guide elements are not required to ensure proper operation of the solenoid device 10.

As indicated above, an adjustment member 34 is provided to adjust the effective length $l_e$ of the two-piece actuator member 14. More specifically, the adjustment member 34 is at least partially disposed within the plunger passage 80 and is engaged with the proximal end 76a of the actuator pin 76. The adjustment member 34 is displaceable along the plunger passage 80 to correspondingly adjust the axial position of the actuator pin 76 relative to the plunger 70 along the actuation axis L. As a result the effective length $l_e$ of the two-piece actuator member 14 can be selectively increased or decreased.

Selective adjustment of the effective length $l_e$ of the two-piece actuator member 14 may be used, for example, to fine tune operation of the solenoid device 10 and the valve mechanism 20 by selecting the optimal effective length $l_e$ to maximize the operating efficiency of the solenoid device 10 and to enhance the performance characteristics of the valve mechanism 20. Additionally, adjustment of the effective length $l_e$ of the two-piece actuator member 14 may also be used to improve valve response times by minimizing solenoid stroke tolerance build-up, thereby decreasing the time required to open and/or close the valve mechanism 20. Moreover, adjustment of the effective length $l_e$ of the two-piece actuator member 14 may also be used to adjust the open position and/or closed position of the valve mechanism 20, particularly with regard to valve mechanisms having multiple open positions, closed positions and/or intermediate positions.

In one embodiment of the invention, the adjustment member 34 comprises a threaded member 120 configured for threading engagement within the threaded portion 82 of the plunger passage 80. In the illustrated embodiment of the invention, the threaded member 120 is a screw, such as, for example, a setscrew. The setscrew 120 defines a shaped recess 122 extending from the proximal end 120a for receiving a corresponding shaped end portion of a driving tool therein to aid in threading the setscrew 120 along the threaded portion 82 of the plunger passage 80. In a specific embodiment, the tool receiving recess 122 has a hexagonal configuration; however, other shapes and configurations are also contemplated as would occur to one of skill in the art.

As illustrated in FIG. 2, the distal end 120b of the setscrew 120 is engaged against the proximal end 76a of the actuator pin 76 to provide the two-piece actuator member 14 with a selected effective length $l_e$. As should be appreciated, threading the screw 120 further into the threaded portion 82 of the plunger passage 80 (toward, the distal end 70b) will increase the effective length $l_e$ while threading the setscrew 120 out of the threaded portion 82 (toward the proximal end 70a) will decrease the effective length $l_e$. A thread locking material is preferably applied to the threads of the setscrew 120 prior to engagement within the threaded portion 82 of the plunger passage 80 to inhibit rotation of the setscrew 120 once a desired effective length $l_e$ of the two-piece actuator member 14 has been reached.

As should be appreciated, the effective length $l_e$ of the two-piece actuator member 14 may be adjusted without removing the solenoid device 10 from the valve mechanism 20. Accordingly, installation and/or maintenance costs may be significantly reduced. In one embodiment of the invention, the actuator pin 76 has an outer cross section sized and shaped to allow the actuator pin 76 to be entirely removed from the core 74 and the plunger 70. More specifically, the actuator pin 76 may be removed from the solenoid device 10 by simply removing the cap member 16 and threading the screw 120 out of the threaded portion 82 of the plunger passage 80 to provide unrestricted access to the actuator pin 76. The actuator pin 76 preferably has a substantially uniform outer cross section along its entire length 1. In one embodiment, the actuator pin 76 has a substantially circular outer cross section; however, other cross sections are also contemplated, including, for example, rectangular or hexagonal cross sections. Notably, the actuator pin 76 may be removed from the solenoid device 10 without having to remove the solenoid device 10 from the valve mechanism 20. In this manner, the actuator pin 74 may be removed and replaced with a similarly configured actuator pin or with an actuator pin having a different length or a different configuration to correspondingly change the operating characteristics of the valve mechanism 20.

The yoke member 36 is formed of a magnetically responsive material, such as, for example, a stainless steel material, a cold rolled steel material, or any other magnetically responsive material that would occur to one of skill in the art. In the illustrated embodiment of the invention, the yoke member 36 is generally comprised of a U-shaped yoke bracket 120 and a yoke washer 122 extending across the open end of the U-shaped yoke bracket 120. Although a particular embodiment of a yoke member 36 has been illustrated and described herein, it should be understood that other types and configurations of yoke members are also contemplated as falling within the scope of the present invention.

In one embodiment of the invention, the U-shaped yoke bracket 120 includes a transverse base plate portion 124 positioned adjacent the distal end 12b of the solenoid body 12, and a pair of axial flange portions 126a, 126b extending from the base plate portion 124 and running along the length of the coil assembly 30. The base plate portion 124 defines a central opening 130 therethrough sized to engagingly receive the distal stem portion 104 of the core 74 therein to anchor the core 74 to the yoke bracket 120 and to align the yoke bracket 120 generally along the actuation axis L. The bobbin rib 54b is engaged with the base plate 124 to anchor the coil assembly 30 to the bracket 120. The yoke flanges 126a, 126b define a plurality of openings 132, the purpose of which will be discussed below. The end portions of the yoke flanges 126a, 126b also define openings or slots 134 for transversely receiving respective end portions of the yoke washer 122 and for providing a passageway for the electrical lead wires 18 through the yoke flange 126a to the electrical lead supports 62. In one embodiment of the invention, the yoke washer 122 has a generally circular, disc-like shape defining a central opening 140 therethrough arranged generally along the actuation axis L and sized to receive the stem portion 88 of the plunger 70 therethrough. The yoke washer 122 also defines a number of slots or openings 142 outwardly offset from the central opening 140 and sized to receive the protrusions 56 extending axially from the bobbin rib 54a to align the yoke washer 122 with the bobbin 40 generally along the actuation axis L.

The outer housing 38 of the solenoid device 10 serves to shield and protect the inner solenoid components from the surrounding external environment. In one embodiment of the invention, the outer housing 38 comprises an encapsulation material 150 surrounding the inner solenoid components to encase the components within a protective outer shell or layer of material. As should be appreciated, the encapsulation material 150 provides a barrier between the internal solenoid components and the external environment to provide protection against exposure to moisture, contaminants, corrosive substances or other elements which might otherwise adversely affect operation of the solenoid device 10. Although a particular embodiment of the solenoid housing 38 has been illustrated and described herein, it should be understood that other types and configurations of housings are also contemplated as would occur to one of skill in the art.

The encapsulation material 150 used to form the solenoid housing 38 preferably exhibits good electrical insulation and thermal dissipation properties and is resistant to water, contaminants, corrosive substances or other potentially harmful environmental elements. Additionally, the encapsulation material 150 is preferably suitable for use in a molding process. In one embodiment of the invention, the encapsulation material 150 is at least partially comprised of a plastic material, such as, for example, a nylon material. In a specific embodiment, the encapsulation material 150 is a reinforced nylon material, such as, for example, Nylon 6/6 which is comprised of a molded 6/6 nylon and a glass reinforcement material. However, it should be understood that other encapsulation materials may also be used in association with the present invention. For example, the encapsulation material 150 may be comprised of an epoxy material, a resin material, such as a high strength polypropylene resign, or a fiber-filled molding compound, such as a copolymer polyester molding compound. Other suitable encapsulation materials are also contemplated as would occur to one of skill in the art.

In one embodiment of the invention, the inner solenoid components are encapsulated within the encapsulation material 150 via a molding process, such as, for example, an injection molding process. The coil assembly 30, the actuator assembly 32, the adjustment member 34, and the yoke member 36 are initially assembled and positioned within a mold (not shown). The encapsulation material 150 is then injected into the mold under pressure to form an outer shell or layer of encapsulation material 150 about the inner solenoid components. The openings 132 and 134 in the yoke flanges 126a, 126b allow the encapsulation material 150 to flow into the spacing or gap between the coil assembly 30 and the yoke flanges 126a, 126b to form a complete and uniform layer of encapsulation material 150 about the coil assembly 30.

In one embodiment of the invention, the electrical leads 18 extending through the solenoid housing 38 are preferably positioned within a jacket or tube member 160 designed to protect or shield the electrical leads 18 from damage and/or wear. In one embodiment of the invention, the protective jacket 160 is formed of a non-conductive material, such as, for example, a plastic or polymeric insulating material. However, other insulating materials are also contemplated as would occur to one of skill in the art. In other embodiments of the invention, an additional outer protective jacket or tube member may surround the portion of the protective jacket 160 adjacent the solenoid housing 38 to provide additional protection and/or shielding of the electrical leads 18. The outer protective jacket or tube member may be formed of a variety of materials, such as, for example, a metallic material including a stainless steel or an aluminum, a plastic material, a composite material, or any other material that would occur to one of skill in the art.

An end portion 160a of the protective jacket 160 is preferably embedded within the encapsulation material 150 to integrally attach the tube member 160 to the solenoid body 12, thereby eliminating the need for additional connection components or complex attachment arrangements. Further details regarding the integral attachment of a protective tube member to a solenoid body via an encapsulation material are illustrated and described in a co-pending U.S. patent application Ser. No. 10/358,489, filed Feb. 5, 2003 and entitled "Encapsulated Solenoid Assembly Having an Integral Armor Tube Cable Protector", the contents of which are hereby incorporated by reference in their entirety.

In the illustrated embodiment of the invention, the encapsulation material 150 forms an outer solenoid housing 38 having a substantially cylindrical stem portion 170 and a substantially rectangular main body portion 172. The stem portion 170 surrounds the end portion 160a of the tube member 160, with the main body portion 172 surrounding the inner components of the solenoid valve. The stem portion 170 preferably extends from and is formed integral with the main body portion 172 so as to define a unitary encapsulation shell. However, it should be appreciated that other configurations of the encapsulation housing 38 are also contemplated. It should be also be appreciated that other shapes and configurations of the step portion 170 and the main body portion 172 of the encapsulation housing 38 are also contemplated. For example, the stem portion 170 may take on a rectangular or hexagonal configuration or any other configuration that would occur to one of skill in the art, and/or the main body portion 172 may take on a cylindrical or hexagonal configuration or any other configuration that would occur to one of skill in the art.

As discussed above, the cap member 16 is removably positioned over an access opening 39 formed through the solenoid housing 38 adjacent the proximal end 12a of the solenoid body 12 to provide uninhibited access to the adjustment screw 120 used to adjust the effective length $l_e$ of the two-piece actuator member 14. In addition to providing selective access to the inner components of the solenoid device 10, the removable cap member 16 also provides a barrier between the inner solenoid components and the external environment to provide protection against exposure to moisture, contaminants, corrosive substances or other elements which might otherwise adversely affect operation of the solenoid device 10. The cap member 16 is preferably engaged with the solenoid housing 38 is such a manner as to provide a substantially fluid tight seal therebetween.

The cap member 16 is preferably formed of a plastic material; however, other materials are also contemplated as would occur to one of skill in the art. In one embodiment of the invention, the cap member 16 has a button-type configuration, including a disc-shaped central cover portion 180 and an annular lip portion 182 extending about the outer perimeter of the cover portion 180. The annular lip 182 is configured for engagement within an annular retention groove 184 formed in the outer surface of the solenoid housing 38. The annular retention groove 184 may be formed in the outer surface of the solenoid housing 38 during the encapsulation process or may be formed by a machining process or some other fabrication process. The cap member 16 also includes an inner cylindrical flange portion 186 extending into a gap or spacing formed between the inner surface of the stop member 72 and the outer surface of the plunger stem 88 to further aid in retaining the cap member 16 in selective engagement with the solenoid housing 38. Notably, the cap member 16 does not require fasteners or other types of separate connection elements for removable attachment to the solenoid body 12.

Although a particular embodiment of a removable cap member 16 has been illustrated and described herein, it should be understood that other types and configurations of removable cap or cover members are also contemplated. For example, a cap member having a threaded stem portion extending axially therefrom and threadingly engagable with the threaded portion 82 of the plunger passage 80 may also be used to releasably attach the cap member of cover to the solenoid body 12.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An electrically operated solenoid for controlling a mechanical device, comprising:

a coil assembly defining an interior region extending along an actuation axis;

an armature member adapted for reciprocating movement along said actuation axis and defining a first passage extending therethrough;

a pole piece member at least partially disposed within said interior region of said coil assembly and defining a second passage extending therethrough generally aligned with said first passage in said armature member;

a shaft member having a first portion disposed within said first passage in said armature member and a second portion extending through said second passage in said pole piece member for engagement with the mechanical device, said shaft member engaged with said armature member such that said reciprocating movement of said armature member correspondingly displaces said shaft member through said second passage in said pole piece along said actuation axis to control operation of the mechanical device; and an adjustment member extending into said first passage in said armature member and into engagement with said first portion of said shaft member, said adjustment member displaceable along said first passage in said armature member to correspondingly adjust a position of said shaft member relative to said armature member along said actuation axis.

2. The solenoid of claim 1, wherein said second portion of said shaft member is guidably displaced along said second passage in said pole piece member during said reciprocating movement.

3. The solenoid of claim 1, wherein said second portion of said shaft member is supported substantially entirely along said second passage in said pole piece member during said reciprocating movement.

4. The solenoid of claim 1, wherein said second portion of said shaft member has an outer cross section sized and shaped in relatively close tolerance with an inner cross section of said second passage in said pole piece member.

5. The solenoid of claim 1, wherein said first portion of said shaft member is supported within said first passage in said armature member along substantially an entire length of said first portion.

6. The solenoid of claim 1, wherein said shaft member has a substantially uniform outer cross section sized for displacement entirely through said second passage in said pole piece member and said first passage in said armature member to allow for removal of said shaft member from the electrically operated solenoid.

7. The solenoid of claim 1, wherein said armature member and said shaft member comprise a two-piece actuator member having an effective length; and wherein displacement of said adjustment member along said first passage in said armature member correspondingly adjusts said effective length of said two-piece actuator member, adjustment of said effective length accomplished while the electrically operated solenoid remains in engagement with the mechanical device.

8. The solenoid of claim 1, wherein said adjustment member comprises a threaded member engaged within a threaded portion of said first passage in said armature member; and wherein threading of said threaded member along said threaded portion of said first passage correspondingly adjusts said position of said shaft member relative to said armature member along said actuation axis.

9. The solenoid of claim 8, further comprising a thread locking material applied to said threaded member prior to engagement within said threaded portion of said first passage, said thread locking material inhibiting rotation of said threaded member to lock said shaft member in a select position relative to said armature member.

10. The solenoid of claim 1, wherein an end portion of said shaft member engages the mechanical device adjacent one end of the electrically operated solenoid, said adjustment member positioned within said first passage in said armature member adjacent an opposite end of the electrically operated solenoid.

11. The solenoid of claim 1, wherein said adjustment member is entirely disposed with an interior region of the electrically operated solenoid.

12. The solenoid of claim 1, further comprising an outer housing defining a passageway extending therethrough along said actuation axis between a first end and an opposite second end, said adjustment member positioned within said passageway adjacent said first end of said outer housing, said second portion of said shaft member extending along said interior region of said coil assembly and into engagement with the mechanical device adjacent said second end of said housing.

13. The solenoid of claim 12, further comprising a cap member removably positioned over said passageway adjacent said first end of said outer housing to selectively cover said passageway.

14. The solenoid of claim 13, wherein said cap member comprises a non-threaded button member.

15. The solenoid of claim 14, wherein said non-threaded button member includes a lip portion received within a retention groove formed adjacent said first end of said outer housing to selectively retain said non-threaded button member in engagement with said outer housing.

16. The solenoid of claim 1, further comprising a stop member, said armature member disposed between said stop member and said pole piece member to limit said reciprocating movement of said armature within a predetermined range of movement.

17. The solenoid of claim 16, wherein said stop member defines an opening extending therethrough to provide unrestricted access to said adjustment member.

18. The solenoid of claim 16, wherein said stop member is removably engaged with the electrically operated solenoid to provide for removal of said armature from the electrically operated solenoid.

19. The solenoid of claim 1, wherein said interior region of said coil assembly is bounded by an inner cylindrical surface defining a substantially uniform inner diameter, said armature member having an outer diameter sized in relatively close tolerance with said inner diameter of said coil assembly to guide said armature member along said actuation axis during said reciprocating movement.

20. An electrically operated solenoid for controlling a mechanical device, comprising:

a bobbin defining an interior region extending along an actuation axis;

an energizing coil wire wound about an exterior region of said bobbin;

a plunger adapted for reciprocating movement along said actuation axis, said plunger defining a first passage extending therethrough, said first passage including a threaded portion;

a core at least partially disposed within said interior region of said bobbin and defining a second passage extending therethrough generally aligned with said first passage in said plunger;

an actuator pin having a first portion disposed within said first passage in said plunger and a second portion extending through said second passage in said core for engagement with the mechanical device, said actuator pin engaged with said plunger such that said reciprocating movement of said plunger correspondingly displaces said actuator pin through said second passage in said core along said actuation axis to control operation of the mechanical device; and an adjustment screw threadingly engaged within said threaded portion of said first passage in said plunger and engaged with said first portion of said actuator pin, said adjustment screw being threadable along said threaded portion of said first passage to correspondingly adjust a position of said actuator pin relative to said plunger along said actuation axis.

21. The solenoid of claim 20, wherein said second portion of said actuator pin is guidably displaced along said second passage in said core during said reciprocating movement.

22. The solenoid of claim 20, wherein said second portion of said actuator pin is supported substantially entirely along said second passage in said core during said reciprocating movement.

23. The solenoid of claim 20, wherein said first portion of said actuator pin is supported within said first passage in said plunger along substantially an entire length of said first portion.

24. The solenoid of claim 20, wherein said plunger and said actuator pin comprise a two-piece actuator member having an effective length; and wherein displacement of said adjustment screw along said first passage in said plunger correspondingly adjusts said effective length of said two-piece actuator member, adjustment of said effective length accomplished while the electrically operated solenoid remains in engagement with the mechanical device.

25. An electrically operated solenoid for controlling a mechanical device, comprising:

an outer housing extending along an actuation axis between a first end and an opposite second end;

a coil assembly defining an interior region having a length extending along said actuation axis;

a plunger adapted for reciprocating movement along said actuation axis and defining a first passage extending therethrough;

an actuator pin having a first end portion disposed within said first passage in said plunger and a second end portion extending along said interior region of said coil assembly for engagement with the mechanical device adjacent said second end of said housing, said actuator pin engaged with said plunger such that said reciprocating movement of said plunger correspondingly displaces said actuator pin along said actuation axis to control operation of the mechanical device; and an adjustment member extending into said first passage in said plunger adjacent said first end of said housing and into engagement with said first portion of said actuator pin, said adjustment member displaceable along said first passage in said armature member to correspondingly adjust a position of said actuator pin relative to said plunger along said actuation axis.

26. The solenoid of claim 25, further comprising a core at least partially disposed within said interior region of said coil assembly and defining a second passage extending therethrough generally aligned with said first passage in said plunger, said actuator pin extending entirely through said second passage in said core for engagement with the mechanical device adjacent said second end of said housing.

27. The solenoid of claim 26, wherein said actuator pin is guidably displaced along said second passage in said core during said reciprocating movement.

28. The solenoid of claim 26, wherein said actuator pin is supported substantially entirely along said second passage in said core during said reciprocating movement.

29. The solenoid of claim 25, wherein said first end portion of said actuator pin is supported within said first passage in said plunger along substantially an entire length of said first end portion.

30. The solenoid of claim 25, wherein said plunger and said actuator pin comprise a two-piece actuator member having an effective length; and wherein displacement of said adjustment member along said first passage in said plunger correspondingly adjusts said effective length of said two-piece actuator member, adjustment of said effective length accomplished while the electrically operated solenoid remains in engagement with the mechanical device.

31. The solenoid of claim 25, wherein said adjustment member is entirely disposed with an interior region of said outer housing.

32. The solenoid of claim 25, further comprising a stop member disposed adjacent said second end of said outer housing to limit said reciprocating movement of said plunger, said stop member defining an opening therethrough to provide unrestricted access to said adjustment member.

33. The solenoid of claim 25, further comprising a cap member removably positioned over a passageway formed adjacent said first end of said outer housing to provide selective access to said adjustment member.

34. The solenoid of claim 33, wherein said cap member comprises a non-threaded button member having a lip portion received within a retention groove formed adjacent said first end of said outer housing to selectively retain said button member in engagement with said outer housing.

35. The solenoid of claim 25, wherein said outer housing comprises an encapsulation material.

* * * * *